Oct. 22, 1946. C. O. LAVETT ET AL 2,409,768
LIQUID LEVEL CONTROL
Filed Dec. 18, 1944 3 Sheets-Sheet 2
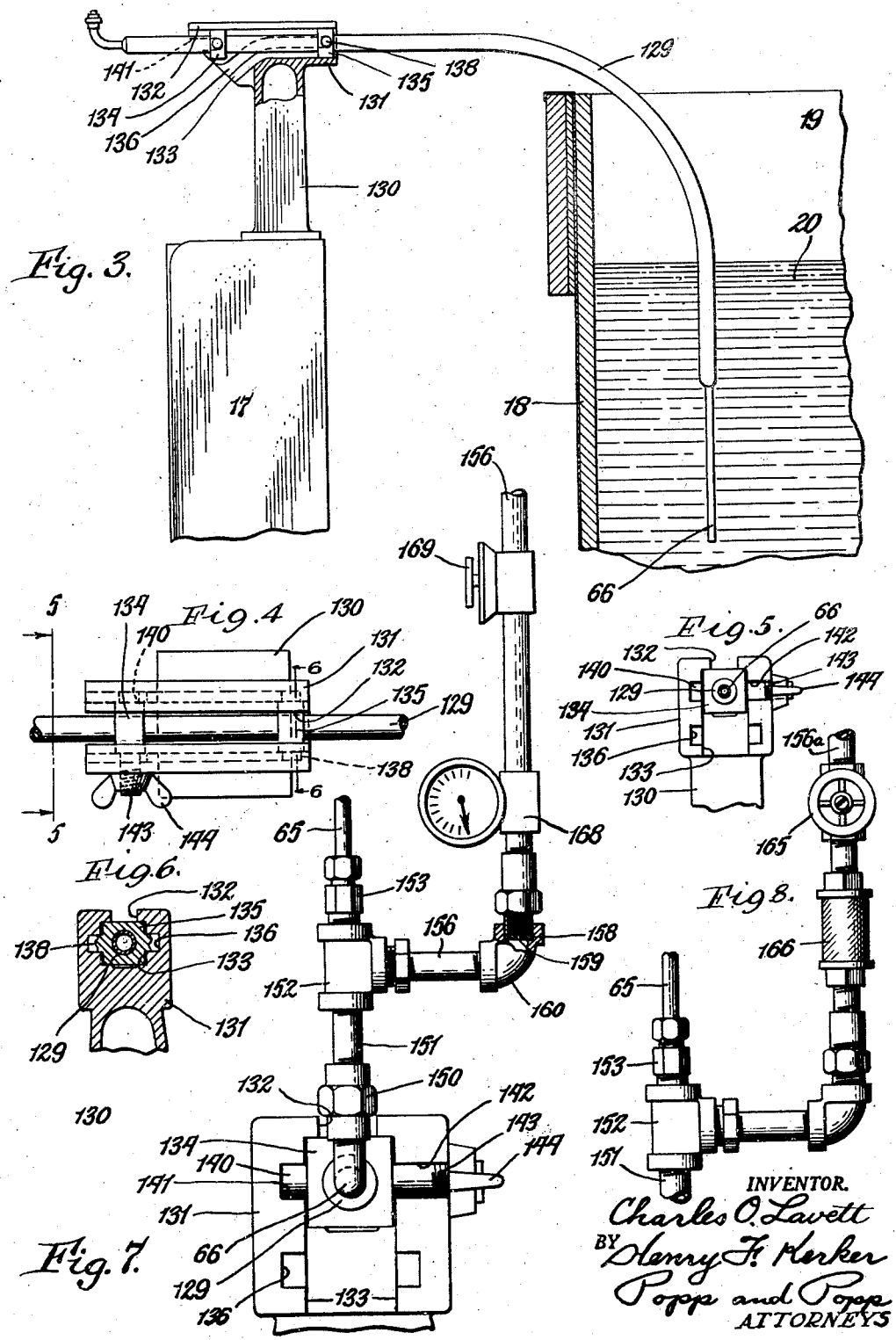
INVENTOR.
Charles O. Lavett
Henry F. Kerker
BY Popp and Popp
ATTORNEYS

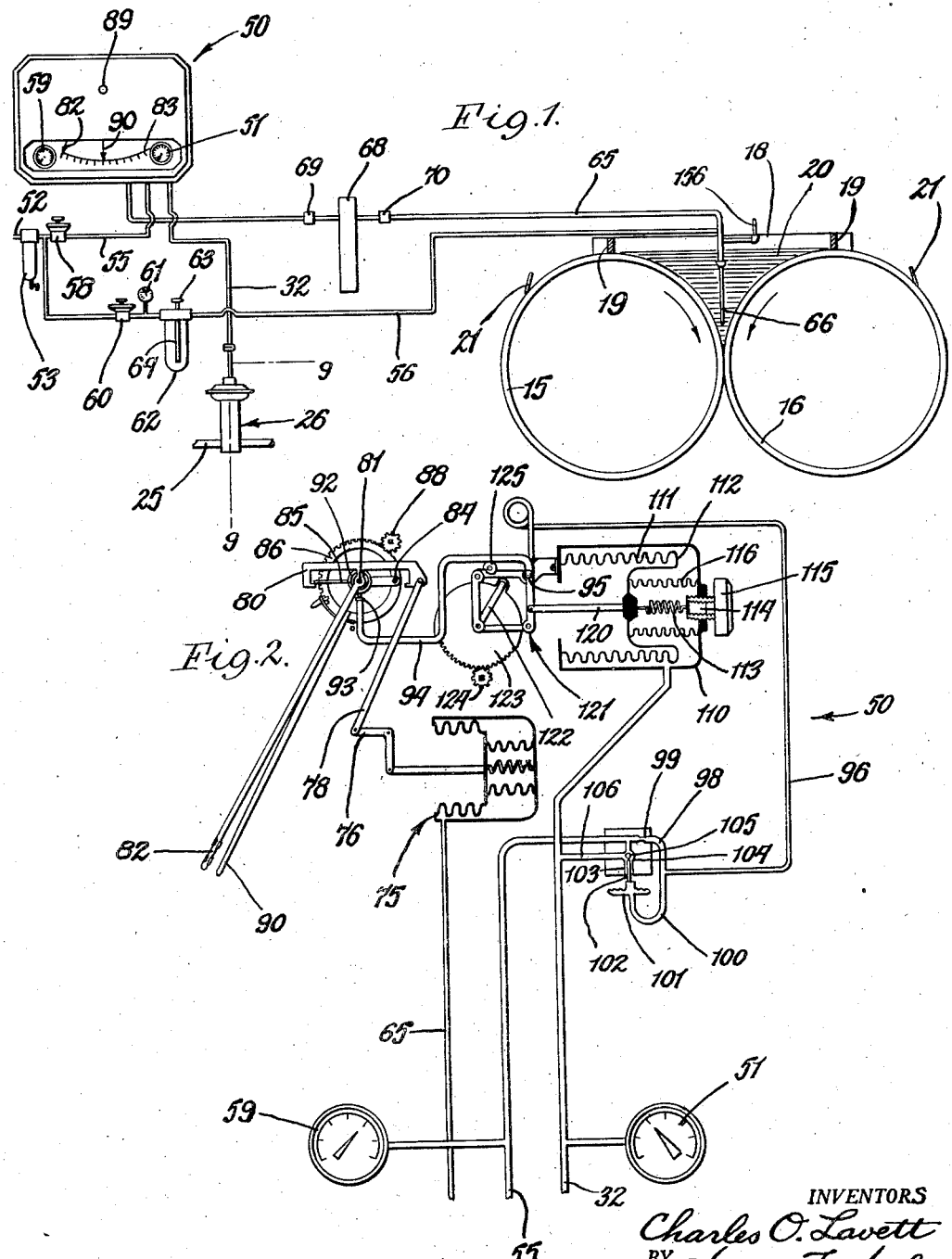

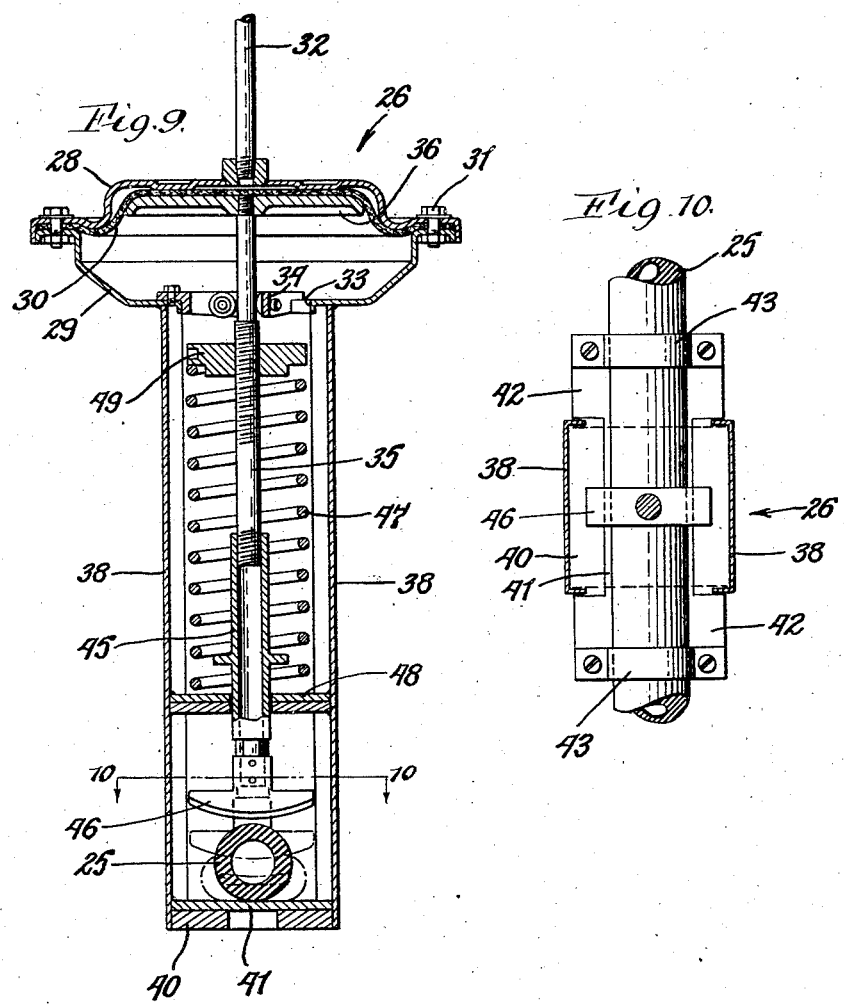

Patented Oct. 22, 1946

2,409,768

UNITED STATES PATENT OFFICE 2,409,768

LIQUID LEVEL CONTROL

Charles O. Lavett, Kenmore, and Henry F. Kerker, Buffalo, N. Y., assignors, by mesne assignments, to Blaw-Knox Company, Pittsburgh, Pa., a corporation of New Jersey Application December 18, 1944, Serial No. 568,662

7 Claims. (Cl. 159—11)

The invention relates to a liquid level control and more particularly to a method and apparatus responsive to the level of hot or boiling liquids for the maintenance of a desired constant level by means of controlling the feed or flow to make up for evaporation and withdrawals of liquid from the holding receptacle or reservoir as in a double drum dryer.

The invention is illustrated in conjunction with an atmospheric double drum dryer having a pair of parallel internally heated drying drums arranged with their peripheries in closely spaced relation to each other and having end boards against their ends for confining a body or pool of liquid in the liquid space or valley between the upper parts of the drums. The liquid in this pool is maintained at the boiling temperature by the heat of the drums effecting a substantial evaporation of water and the drums are rotated so as to move downwardly at their line of closest approach so as to remove from the pool films of the liquid, the thickness of these films being determined principally by the spacing of the drums and these films being dried by the heat of the drums as they travel around the underside of the drums and upward toward the knife. Near the top of each of the drums a knife or doctor blade is provided for scraping the dried film from the drum into a suitable receiver or conveyer, the scraped surface of the drum then passing into the pool to pick up a fresh film of liquid.

On a double drum dryer the effect of fluctuating liquor levels upon operation, capacity, foaming, quality and moisture uniformity of the dry product has been a recognized fact for years and many attempts have been made to automatically control the liquor level by means of floats, overflows, air operated controls, etc. without any satisfactory results. The difficulty of control has been due mainly to violent boiling, spattering, foaming, accumulation and solidification of solids from the liquid on any exposed part of the control as well as plugging of submerged parts on heavily concentrated liquids.

The nearest approach to liquor level control known to us in a variable speed positive displacement liquor feed pump mentioned in United States Patent No. 2,129,329 and shown in conjunction with the liquor feed for drum dryer described therein. Feeding by means of such a pump insures a steady flow of feed liquor at a set speed. Any changes in liquor level does not in any way affect the rate of flow and the liquor level has to be observed by the operator at intervals and pump speed changed when necessary to compensate for any change in liquor level, if concentration of feed liquor or steam pressure should vary, even to a slight degree, frequent speed changes are necessary.

With the exception of dryers using a feed pump the dryers are fed by means of a manually operated cock or valve and the degree of liquid level stability is dependent upon the attention, ability and judgement of the operator.

The value of the automatic liquor level control forming the subject of the present invention as compared to manual control of feed liquor can best be illustrated by performance in a plant having three atmospheric double drum dryers of the same type and size. The tests were made on distillery slop taken from the same feed tank and with all drums carrying the same steam pressure. One of these dryers was equipped with the automatic liquor level control, required practically no attention after starting dryer operation and produced approximately 40% more dry material than each of the other two dryers which were fed by means of manually operated gate valves. The two manually fed dryers required close attention and frequent adjustment of the feed valve, as determined and judged by the operator after probing with a wooden stick for the liquor level between the drums. The use of a probing stick was necessary as the operator was unable to see the liquor level on account of spattering and dense cloud of vapors from the boiling liquid.

To obtain the best operating conditions on double drum dryers it is of extreme importance to maintain a constant steady level of the liquid held between the drums. Fluctuations of level causes variation in film thickness and moisture contents in the dry product, excessive spattering, increases the foaming on some products, etc. If through fluctuations the product film becomes too dry, at times difficulty is experienced on many materials with the knives removing such overdried film from the drums, causing splitting of the film into two layers, one of which adheres to the drum, baking or burning on the hot drum surfaces with resulting contamination when the burned on material is periodically removed, inferior dry product, reduced capacity and excessive wear on knives.

The practical height of liquid level carried between drums varies on different products. On products sensitive to heat or prolonged boiling, a lower level is carried for the purpose of reducing volume and time that the liquid is subjected to boiling temperatures. Also on materials where the liquid fed has a tendency toward extremely rapid concentration, jellying or precipitation, a lower level is carried reducing the volume of liquid held between the drums to a point where jel or precipitation tendencies will not affect the application or adherence of a product film to the drum surfaces.

Whatever liquid level is carried, the important point to get maximum capacity, quality and uniformity of the dry product at such level is to control the feed liquor flow to the dryer so as to maintain a steady constant level. The flow of feed liquid to the dryer should be a controlled continuous flow. An automatic control using an open and closed type feed valve, that is, a feed valve that would open when the level dropped to a certain point and close when the level reached a certain height, even within narrow limits, has its objections due to the fact that practically all liquids fed to the dryers are at a temperature far below their boiling point and a sudden gush of such liquids into the boiling liquid held between the drums would temporarily stop the boiling due to sudden drop in temperature and somewhat dilute or decrease the density of the liquid held between drums, thus upsetting the equilibrium and steady drying condition.

On most products, such as skim milk, buttermilk, brewer's yeast, distillery slop and many others, the liquor level can and should be carried sufficiently high to cover the entire heating surface available in the valley or liquor space between the drums for the following reasons:

1. Since evaporation and capacity of the drier is contingent upon the heating surface used, it follows that all available surface should be utilized. The available heating surface in the space or valley for the pool of liquid is the inner upper quarter of each drum, or 25% of the total drum surface, and by holding the liquor level accurately close to the upper extremities of the drums the maximum of this available surface is utilized.

2. With feed liquor, such as preconcentrated distillery slop, containing 31% solids and using the entire heating surface available in the liquor space and automatic controlled liquor level, actual field test showed 22.33% of water evaporated from the body of liquid held in the liquid space or valley between drums. With drums having a 42 inch diameter and 120 inches long, a drop in the liquor level of only 2 inches below the top of the drums exposes or renders inactive 15 square feet of heating surface, this being equal to approximately 27% of the available surface in the liquid space. It will therefore be seen that slight variations in the level of the pool of liquid held between the drums results in a pronounced variation in the available heating surface used.

3. An important object of maintaining a high steady liquor level sufficient to cover the entire heating surface in the liquor space is to utilize all surface available for the purpose of evaporating as much water as possible from the boiling liquid, thus increasing the density or solid contents so as to deposit a heavier product film on the drums and thus increasing the capacity of the dryer.

4. By maintaining a proper and steady level in the pool of liquid held between the drums, the concentration of the liquid held between the drums and also the removal of moisture from the films on the drums is held practically constant.

5. With fluctuating liquid levels of the pool of liquid the equilibrium of the liquid in this pool is upset. Thus, with a varying liquid level the ratio of liquid volume to the heating surface varies, the temperature, amount of evaporation and density of the liquid in the pool fluctuates. Further, the film thickness and evaporation of water from the film leaving the pinch or line of closest approach of the drum varies. With a constant drum speed and steam pressure in the drums, the operator adjusts the drum spacing to obtain a good film of proper dryness at the maximum liquid level, but as this level drops, concentration of the liquid increases, there is less water to evaporate from the product film on the drums, and as moisture contents decrease it becomes more difficult for the knives to remove the film from the drum surface. With liquors, such as and similar to distillery slops, if very dry, the film adheres tenaciously to the hot drum surfaces tending to flex the knives causing them to ride over or split the baked on film. The unremoved film insulates the hot drum surface; reduces the effective spacing between the drums at their line of closest approach; and also provides a surface to which the feed liquor does not readily adhere. The liquid which does adhere to the unremoved film is usually removed by knives in the form of a very light, fragile or ragged film until the baked on or charred adherent film is removed, thus causing a reduction in capacity and excessive wear on the knives. Unfortunately to remove this burnt on film the operators usually resort to spudding the knife which frequently causes dulling and cracking of the knives, scored and gouged drums and other harmful results. There is no difficulty removing the dry film containing the proper amount of moisture from a drying drum and the life of the knife edge and drum is greatly extended by maintaining a uniform condition of the removed film.

Accordingly, it is the principal object of the present invention to provide a liquid level control which can be used to control with a high degree of accuracy a liquid subject to diminution and particularly a boiling liquid containing solids that are being dried.

Another object is to provide such a liquid level control which will not be subject to variation in its action due to the drying or splattering thereon of the liquid being controlled.

Another object is to provide such a liquid level control in which the parts immersed in or subject to the splattering of the pool of liquid being controlled can readily be removed and cleaned.

Another object is to provide such a liquid level control in which surges or hunting action are dampened or avoided.

Another object is to provide such a liquid level control which is readily set, by means of a remote controller and dial, to maintain any level desired and in which any variation in the level from that desired is instantly observable.

Another object is to provide such a liquid level control utilizing compressed air, steam, or other gaseous medium and which can be maintained in proper operating condition by the use of either steam or water to prevent the drying of the liquid on the controlling surfaces.

Another object is to provide a liquid level control which delivers a continuous controlled flow of feed liquid at a rate required to maintain a constant level and thus reduce to a minimum any foaming tendencies as the liquid is quickly brought up to its boiling point.

Another object is to provide such a liquid level control which delivers a continuous controlled flow of feed liquid at a rate required to maintain a constant level and thus permit the boiling of the liquid between drums to continue at a uniform rate.

Another object is to provide a dependable liquor level control to eliminate the close attention now required by the operator thus reducing operating costs as one operator, when using the automatic control, can take care of several dryers.

Another object is to provide a dependable automatic control of the liquor level at a set point for the purpose of smoother operation, uniformity and higher quality of dry product, reduction in wear of knives and drum surfaces and increased capacity of the dryer.

Another object is to provide a dependable automatic liquor level control which delivers a continuous controlled flow at a rate required to maintain constant liquor level to retard foaming of liquids having such tendencies to a minimum and prevent boiling over with subsequent loss of material, deposit and burning on of boiled over liquid on drum heads, drum journals, etc., such requiring the necessity of more frequent shut downs for cleaning with a loss in production during such shut downs, expense in cleaning, etc., resulting in an increased overall production cost.

Another object is to provide a dependable liquor level control to enable unskilled labor to operate and obtain maximum production on double drum dryers.

Another object is to provide such a liquid level control which is comparatively simple in construction and operation and will stand up under conditions of severe and constant use without getting out of order or requiring repairs.

In the accompanying drawings:

Fig. 1 is a diagrammatic representation of a liquid level control embodying the present invention and used to maintain an accurate and constant level of the boiling liquid in the liquid space or valley between the two drums of an atmospheric double drum dryer.

Fig. 2 is a diagrammatic representation of the indicating pressure controller used in conjunction with the apparatus.

Fig. 3 is a fragmentary vertical longitudinal section between the two drums of the atmospheric dryer and showing the manner in which the purge or bleed pipe forming part of the liquid level control forming the subject of the present invention is attached thereto.

Fig. 4 is a fragmentary top plan view of the anchorage for the purge or bleed pipe, as shown in Fig. 3.

Figs. 5 and 6 are fragmentary vertical sectional views taken on the correspondingly numbered lines on Fig. 4.

Fig. 7 is an enlarged elevational view of the piping through which air and steam are supplied to the bleed pipe shown in Figs. 3-6.

Fig. 8 is a view similar to Fig. 7 and showing a modified form of the invention in which water, instead of steam, is supplied to the purge pipe.

Fig. 9 is an enlarged vertical section through the diaphragm valve directly controlling the flow of feed liquid, this section being taken on line 9—9, Fig. 1.

Fig. 10 is a fragmentary horizontal section, taken on line 10—10, Fig. 9.

The liquid level control is shown in conjunction with a double drum atmospheric dryer having two parallel drums 15, 16 arranged side by side and which are internally heated, as by steam. These drums are journalled in any suitable manner in supporting bearings on end frames 17 and driven to rotate so that the sides opposing each other travel downwardly, as indicated by the arrows in Fig. 1. Vertical end boards 18 are supported against the opposite ends of the pair of drums 15, 16 and these end boards are connected by side boards or plates 19, each of these side boards extending lengthwise of and in contact with the crest of a corresponding drum. The end boards 18 and side boards 19 jointly confine a body 20 of the liquid to be dried in the liquid space or valley between the inner upper quarters of the two drums. The drums are spaced a slight distance apart and as the drums rotate, as shown, a film of the liquid from the body 20 is picked up by the surface of each drum and carried through the pinch or line of closest approach of the drums in the form of a thin layer or film, the thickness of this layer being principally determined by the spacing of the drums. As this layer passes around the undersides of its drum, it dries and is scraped off by a doctor blade or knife 21. The cleaned drum surfaces then reenter the pool or body of liquid 20 to repeat the operation, the continuously forming films on the drums being removed by the doctor blades 21. The liquid fed into the body 20 in the liquid space between the drums contains a large percentage of water and boils under the heat of the drums, a large percentage of the water being evaporated from this body of liquid. The principal object of the invention is to maintain the level of this body 20 of liquid in the liquid space between the drums constant at any desired point, preferably one or two inches above the drums, so as to utilize the maximum available drying surface for this body, that is, the upper inner quarters of the drums, and also to maintain a uniform concentration and temperature of the liquid in this body and hence uniformity in the moisture content of the films removed from the drums by the doctor blades 21.

In general the control forming the subject of the present invention, in its preferred form, works on the air or gas bubbling principle, in which a small amount of air or gas is bled through a purge or bleed pipe which is submerged a set distance below the top of the drums. The back pressure on the air is a direct measure of the height of liquid above the bottom of the purge or bleed pipe. This pressure is transferred through a balance or control line to a sensitive measuring element which in turn actuates the controller. The flow of feed liquid to the drums is controlled by an air operated rubber lined valve located preferably near the vapor hood. On boiling liquids an essential feature of the invention resides in keeping the inner surface at the lower end of the bleed or purge pipe clean to prevent reduction of its area. Where a moisture absorbing gas is used as the controlling medium, this reduction of the area of the purge or bleed pipe is caused by the continued drying out of the successively deposited coatings of the boiling liquid by the passage of the moisture absorbing gas over the surface of these coatings, these successively deposited coatings being formed by the surging of the boiling liquid into and out of the open end of the purge pipe. With such moisture absorbing gas as the controlling medium we have found that the purge or bleed pipe can be kept clean by introducing a small amount of moisture in the form of steam or water into the stream of gas passing through the bleed or purge pipe.

The feed liquid is supplied to the body 20 of liquid in the liquid space between the drums through a feed liquid line or hose 25 which is shown as being made of rubber or other collapsible material. This rubber feed line or hose passes through a diaphragm valve 26 which operates to press the opposite walls of the rubber hose together to restrict or cut off the flow of feed liquid therethrough or to permit the walls of the hose to distend and permit the passage of a greater amount of feed liquid.

For this purpose, as best shown in Figs. 9 and 10, the diaphragm valve 26 comprises a diaphragm chamber composed of an upper upwardly dished annular head 28 and a lower downwardly dished annular head 29, the rims of these heads confining between them the rim of a flexible diaphragm 30 which is firmly held therebetween by bolts 31. The air for operating the diaphragm valve is supplied through the upper head 28 to the space above the diaphragm 30 by an air pressure line 32 and the lower head 29 is provided with a central opening 33 in which is mounted a guide 34 for a plunger rod 35. An annular rigid head 36 is secured to the upper end of the plunger rod 35 to bear against the underside of the flexible diaphragm 30 and the lower end of this plunger rod 35 extends between two spaced depending legs 38 which are shown as being of channel form in cross section. At their lower ends the depending legs 38 are connected by a cross piece 40 and on this cross piece is removably arranged a flat saddle plate or support 41 for the rubber hose 25, this hose resting upon the saddle plate or support 41 and extending horizontally between the two depending legs 38 of the diaphragm valve. The saddle plate or support 41 can be of any suitable form and is shown as having opposite horizontal extensions 42 so as to carry a substantial length of the rubber hose 25 and each of these extensions being shown as provided at its extremity with an arching hose clamp 43 for securing the hose thereto.

A vertical tube 45 is screwed onto the lower end of the plunger rod 35 and carries a presser foot 46 at its lower end, this presser foot engaging the upper side of the hose 25 to compress it and restrict the flow of the feed liquid therethrough. This presser foot and the diaphragm 30 are yieldingly held in an elevated inoperative position by a helical compresion spring 47 which is seated at its lower end on an intermediate cross piece 48 connecting the depending legs 38 of the diaphragm valve and bearing at its upper end against the underside of a nut 49 provided on an intermediate threaded portion of the plunger rod 35. It will be seen that when sufficient air pressure is introduced through the line 32, the flexible diaphragm, plunger rod head 36, plunger rod 35, tube 45 and presser foot 46 are driven downwardly thereby to press the rubber hose 25 from the round condition shown by full lines in Fig. 9 to the dotted line condition shown, this constricting the amount of liquid fed to the body 20 in the liquid space between the drying drums. When this pressure in the line 32 is relieved, the return spring 47, acting against the nut 49 forces the plunger rod 35 upwardly thereby returning the flexible diaphragm 30 to its upper position shown in Fig. 9 and lifting the presser foot 46 from engagement with the rubber hose 25 thereby permitting the rubber hose to distend and deliver the full flow of liquid to the liquid space between the drying drums. It will further be seen that screwing the tube 45 up or down will adjust the distance of travel of the foot 46 in closing and opening the valve.

The line 32 to the diaphragm valve 26 connects with the variable output pressure side of an indicating controller indicated generally at 50, the pressure in this line 32, and hence on the diaphragm of the diaphragm valve 26 being indicated on a gauge 51 in the right hand side of the casing of the controller, this pressure varying from, say, 0 to 20 pounds. The main air supply line 52, having an air filter 53, branches off into lines 55 and 56. The branch 55 contains a pressure reducing valve 58 which is set to maintain a pressure of, say, 20 pounds in the branch line 55, this pressure registering on a gauge 59 in the left hand side of the casing of the controller 50.

The branch line 56 contains a pressure reducing valve 60, a pressure gage 61 and a bubbler 62. This pressure reducing valve 60 is set to maintain, say, approximately 3 pounds pressure in the branch line 56 on the inlet side of the bubbler 62, this pressure being indicated on the gage 61. From the pressure reducing valve the air passes through the air bubbler 62, this bubbler including a glass bowl partly filled with water or oil, the air flowing through the line 56 being conducted, under control of a valve 63, through a tube 64 leading to the bottom of the body of oil in the bubbler 62 and bubbling up therethrough, this bubbling being observable through the glass bowl of the bubbler.

The branch line 56 delivers a regulated amount of air to a control line 65, one end of this control line 65 leading to a balancing, purge or bleed pipe 66 one end of which is open and is immersed in the body 20 of liquid in the liquid space between the drying drums so as to form, in effect, a chamber having an opening in its underside. The other end of this control line 65 connects with the low pressure side of the indicating pressure controller 50 through a tank 68 having sufficient capacity to damp out surges in the control line 65 before reaching the controller 50. This surge tank is flanked on each side by fittings 69 and 70 which are in the control line 65 and each of which provides an orifice in the order of .020 inch to further damp out surges in the control line 65 before reaching the controller 50.

The indicating pressure controller 50 is essentially a sensitive direct acting air pressure relay having an indicator, the relatively slight pressure fluctuations in the low pressure control line 65 actuating the controller to effect corresponding and relatively large changes in the variable output pressure line 32 leading to the diaphragm valve 26 thereby to control the feed of liquor to the drums in response to the relatively slight fluctuations in pressure in the control line 65. As best shown in Fig. 2, the low pressure control line 65 transmits pressure to a sensitive bellows 75, the diaphragm of which moves in response to slight pressure changes in the control line 65. The diaphragm of the bellows 75 is connected, through a bell crank 76 and a link 78, with the right hand end of an arm 80 as viewed in Fig. 2. This arm is pivoted at 81 and an indicating hand or pointer 82 is fast thereto, this indicating hand 82 traversing a scale 83, as shown in Fig. 1. The left hand end of the arm 80, as viewed in Fig. 2, is hook-shaped and engages the underside of the free end of an arm 85, this arm being pivoted at 84 at its opposite end to an adjusting gear ring 86. This adjusting gear ring 86 is turned by a pinion 88, the shaft of which extends through the front wall of the controller casing and is provided with a knob 89 for manual adjustment. On this gear ring is also mounted a set hand or pointer 90 which also traverses the scale 83 as shown in Fig. 1.

The arm 85 is formed at its center to provide a baffle ring 92 which is arranged to rest on and throttle the nozzle 93 of a tubular arm 94, this tubular arm being pivoted at 95 to a stationary support. This tubular arm connects with an air pressure line 96, one branch 98 of which connects, through a restriction 99, with the branch 55 of the air pressure supply line 52. The other branch 100 of the line 96 connects with a capsular chamber 101 having a diaphragm on its upper side carrying a vertical pin 102. This pin projects into the lower end of a vent tube 103, the upper end of which connects with the line 55 leading to the main air pressure supply line 52. At its center this vent tube is provided with an enlargement 104 forming upper and lower seats for a ball 105 therein. The side of this central enlargement 104 of the vent tube 103 is connected by a branch line 106 with the line 32 leading to the diaphragm valve 26. The upper end of the pin 102 engages the ball 105 to move it to engage either the upper or lower seat in the enlargement 104 or to hold an intermediate position.

The line 32 leading to the diaphragm control valve 26 connects with a stationary casing 110 having a bellows 111 across its open end. This bellows has a cup-shaped head 112 and this head is connected by a helical tension spring 113 with a nut 114 working in an internally threaded bore provided in the stem of an adjusting screw 115 screwed into the closed end wall of the stationary casing 110. Leakage is prevented around the stem of the adjusting screw 115 by a second bellows 116 enclosing the spring 113 and a stem of the screw 115 and connecting the head 112 of the bellows 111 with the closed end wall of the stationary casing 110.

The head 112 of the bellows 111 connects with a pushing pin 120 which extends horizontally through the open end of the stationary casing 110 and pivotally connects with a vertical link of a parallelogram linkage 121. One corner of this parallelogram linkage is connected with the stationary pivot 95 and the opposite corner is connected by a link 122 with the upper part of the rim of a gear wheel 123 which can be turned by means of an adjusting pinion 124. The upper link of the parallelogram linkage is formed to provide an abutment 125 on which the tubular arm 94 rests.

To provide the necessary rigidity for mounting the relatively small diameter purge or bleed pipe 66 on one of the end frames 17 of the dryer, it is enclosed for the greater part of its length within a pipe or tube 129 of larger diameter, the ends of this enclosing pipe 129 being shown as being welded to the purge or bleed pipe 66. The bleed pipe 66, together with its supporting pipe 129, is bent to provide a right angle bend, the bleed pipe having an open ended vertical leg which is immersed in the body 20 of liquid in the liquid space between the drums. The horizontal leg of the enclosing pipe 129 is shown as removably mounted on one of the end frames 17 of the dryer as follows:

The numeral 130 represents a supporting bracket or post suitably mounted on one of the end frames 17 of the dryer and having an elongated head 131 at its upper end. This head is longitudinally slotted to receive the horizontal leg of the supporting pipe 129, this slot being comparatively narrow at its upper end, as indicated at 132, and being comparatively wide at its inner end, as indicated at 133. The outer narrow part 132 of this slot is of sufficient width to just receive the enclosing pipe 129 of the bleed pipe and the inner enlarged part 133 of this slot is of sufficient width to receive a pair of square collars 134, 135 which are fixed to the supporting pipe 129 in spaced relation to each other. The sides of the enlarged part 133 are shown as being flat and parallel to fit the square sides of the collars 134, 135 and are provided with a pair of opposing grooves or guideways 136 which receive pins or lugs 138 projecting outwardly from opposite sides of the forward collar 135. This pair of grooves or guideways 136 incline upwardly from the lower rear part of the head 131 to a horizontal part which terminates short of the forward end of the head 131. The rear collar 134 is provided on one side with a pin or lug 140 which is fitted in a short groove or guideway 141 extending horizontally forward a short distance from the upper rear part of the head 131 along the corresponding wall of the enlarged part 133 of the slot, and on the opposite side of the head 131 a correspondingly shaped horizontal slot 142 is provided to receive a threaded stud 143. This stud is provided with a wing nut 144 which is tightened to secure the bleed pipe in position in the holder.

The end of the horizontal leg of the purge or bleed pipe 66 is shown as connected to the control line 65 through a union 150, nipple 151, T 152 and fitting 153, as shown in Fig. 7. The T 152 is provided to bleed in a small amount of low pressure steam with the air from the control line 65 to keep the end of the bleed pipe 66 wet and prevent the material under control from drying out and plugging the bleed pipe. For this purpose a low pressure steam line 156 connects with the T 152. In order to meter the amount of steam so bled into the air, a disk 158 having a metering orifice 159 can be inserted in one of the pipe fittings, such as in the elbow 160 as shown in Fig. 7.

Instead of introducing steam for this purpose, it is also possible to introduce water. This modification of the invention is illustrated in Fig. 8 in which a water pipe 156a is substituted for the steam line 156, the water pipe containing a needle valve 165 from which water is fed drop by drop through a sight glass 166, this water entering the T 152 between the control line 65 and the purge pipe 66.

*Operation*

At the start of the operation, it is assumed that the bleed or purge pipe 66 has been removed, this having been effected by breaking the union 150 and by loosening the wing nut 144, this permitting the operator to withdraw the bleed or purge pipe 66 from the supporting head 131, the pin 140 and stud 143 of the collar 134 sliding out of the horizontal groove 141 and slot 142 in the head 131 and the pins 138 of the collar 135 sliding out of the longer opposed grooves 136 in the head 131. After the collars 134 and 135 have been so freed from the head 131, the supporting pipe 129, for the purge pipe 66, can be lifted out of the narrow part 132 of the slot in this head 131.

The operator first inspects and cleans the bleed or purge pipe 66, in particular making sure that the inner surface at the open lower end of this purge pipe is clean. The operator then alines the pins 138 of the collar 135 with the open rear ends of the opposed grooves 136 in the side walls of the enlarged part 133 of the slot in the head 131 and moves this collar 135 and the purge pipe 66 connected therewith upwardly and then forwardly in following the grooves 136. At the end of this movement the pin 140 and stud 143 are inserted in the groove 141 and slot 142, respectively, of the head 131 and the wing nut 144 is tightened to secure the purge pipe 66 in position.

The operator then connects the union 150 so as to connect the bleed or purge pipe 66 with the control line 65 and steam line 156, it being important that these connections are tight.

The reducing valve 58 is adjusted to register the assumed 20 pounds of pressure on the gage 59 and the reducing valve 60 adjusted to register 3 pounds pressure on the gage 61. The needle valve 63 on the sight feed bubbler 62 is then slowly opened until the proper bubbling rate or operating pressure in the line 56 beyond the bubbler is established. This pressure must, of course, be slightly in excess of that required to overcome the hydrostatic head of the body of liquor 20 above the lower end of the purge or bleed pipe 66. If the gage pressure as registered on the gage 61 shows a drop in pressure when the sight feed needle valve 63 of the bubbler 62 is opened, the reducing valve 60 is readjusted to maintain 3 pounds pressure as indicated by the gage 61.

Low pressure steam is then admitted through the steam line 156, this low pressure steam being metered on passing through the orifice 159 and saturating the air admitted to the purge or bleed pipe 66 from the branch line 56.

The operator then starts the feed of liquid to the dryer to build up the body 20 of liquid in the liquid space between the drums. This can be done through a bypass around the diaphragm valve 26, or in any other suitable manner, and when the liquid reaches the top of the drums 15, 16 the bypass is closed to admit further feed liquid only through the diaphragm valve 26. The liquid level control forming the subject of the invention is now in operation, the air supplied to the branch line 56 under control of the air pressure regulator 60, bubbler 62 and its needle valve 63, passing into the bleed or purge pipe 66, this air escaping in the form of bubbles from the open lower end of the bleed or purge pipe 66 and escaping upwardly through the body 20 of liquid in the liquid space between the drying drums. At the outset the air bubbles from the lower open end of the bleed or purge pipe 66 will escape more readily inasmuch as the body 20 of liquid between the drums has not as yet become concentrated. This body 20 of liquid held between the drums gradually concentrates, thus increasing its specific gravity. This concentration continues for some time, possibly an hour or more, before a point is reached where the density remains constant. During this time the level of the body 20 of liquid should be watched and adjustments made to compensate for increases in density.

The pressure of the air in the control line 65 is always sufficient to effect the bleeding of the air through the lower open end of the balancing or purge pipe 66 in the form of bubbles. As the air bubbles from the lower end of the balancing or purge pipe 66, there is a slight surge in this bleed pipe 66 as well as in the control line 65. While these surges are dampened before reaching the controller 50 by the capacity tank 68 and the two restricted orifice fittings 69 and 70 flanking this capacity tank, such surging has an important effect upon the operation of the apparatus in that it would cause the open end of the pipe 66 to gradually plug up unless steam or water were admitted to the air bubbled out through this purge pipe 66. Thus, in operation it appears that as a large bubble of air is forming and expanding at the lower open end of the balancing or purge pipe 66, the pressure in this purge pipe 66 and in the control line 65 is momentarily slightly increased. When the bubble leaves the lower open end of the balancing or purge pipe 66 a slight pressure drop occurs in this purge pipe 66 and control line 65, this permitting the liquid from the pool 20 to enter the lower end of the pipe 66 for a short distance, this being about one inch in a one-quarter inch pipe and about two inches in a three-quarters inch pipe. The time cycle for the surging or movement of the air and liquid in and out of the lower open end of the pipe 66 is quite regular and is a matter of a fraction of a second.

Without the addition of steam or water to the air flowing through the balancing or bleed pipe 66, it was found that each time the liquid from the body 20 entered and was ejected from the open lower end of the bleed pipe, a film of liquid was left inside the lower end of the bleed pipe, these films drying and gradually reducing the effective diameter of the outlet of the bleed pipe 66 until it became almost completely plugged. To overcome this condition, the steam line 156 is connected to the inlet of the bleed pipe 66, this steam being supplied at low pressure through the very small orifice 159 into the air flowing from the branch line 56 into the bleed pipe 66. This steam is introduced in an amount sufficient to humidify the air in the bleed pipe 66 with moisture and hence destroy any tendency of this air to dry the liquid 20 as it surges into and out of the lower open end of the bleed pipe.

The modification shown in Fig. 8, in which water is used for this purpose, has also been found to be effective. In this form of the invention the valve 165 is opened to permit water to drip through the sight glass 166 from which it flows into the bleed pipe 66 and humidifies the air flowing through this pipe. In practice, a very small quantity of either steam or water is required and has been found to effectively prevent the building up of such a coating at the lower end of the bleed pipe 66.

As the level of liquid in the body 20 in the space between the drums lowers, the back pressure in the bleed pipe 66 and control line 65 lowers, this lowering pressure being transmitted through the capacity tank 68 and its flanking orifice fittings 69 and 70 to the bellows 75. Since the pressure in this bellows is low its diaphragm is retracted, thereby, through the link 72 holding the left hand end of arm 80, as viewed in Fig. 2, depressed, this arm pivoting at 81. The left hand end of arm 85 is thereby released and its circular baffle 92 rests on the tip of the nozzle 93. Air entering the pilot system from the air supply branch 55 and through the orifice or contraction 99 does not escape freely from the nozzle 93 and therefore builds up pressure in the capsular chamber 101, inflating it. The inflation of the capsular chamber 101 raises its diaphragm and pin 102 and seats the air relay ball 105 against the upper seat of the enlargement 104 of the vent tube 103 thereby preventing air from passing from the supply branch 55 through the upper part of vent tube 103 into the line 32 leading to the control valve 26 for the liquid supply to the dryer. This, of course, relieves the pressure on the diaphragm 30 of this control valve 26, the spring 47 thereby opening this valve and permitting liquor to flow into the body of liquid 20 in the liquor space between the drums to restore its level.

As the level of the liquid in the body 20 approaches that for which the controller is set, the back pressure in the bleed pipe 66 and control line 65 increases thereby causing the bellows 75 to expand. The diaphragm of this bellows 75, through the bell crank 76 and link 78, moves the arm 80 clockwise about its pivot 81. The hooked left hand end of this arm 80 lifts the free end of the arm 85 thereby lifting its circular baffle 92 away from the tip of the nozzle 93. Air therefore escapes from this nozzle 93 and thereby deflates the capsular chamber 101. The pin 102 on the diaphragm of this capsular chamber 101 thereby lowers the ball 105 to the intermediate position shown in Fig. 2 in which it is out of contact with both the upper and lower seats provided by the enlargement 104 of the vent tube 103. Air therefore flows from the supply branch 55, through upper part of vent tube 103 into the branch 106 of the line 32 leading to the diaphragm valve 26, this air pressure being impressed on the diaphragm 30 of this valve 26 so as to move this valve toward its closed position and reduce the further feed of liquor to the body 20 between the drums.

The set point of the controller 50 can be adjusted to maintain any desired level in the body 20 of liquid held between the drums. Thus, by turning the knob 89 on the shaft of the pinion 88, this pinion and the gear 86 are rotated to move the set hand 90 to any position along the scale 83. This shifts the fulcrum point 84 of the arm 85 and since its baffle ring 92 is supported on the nozzle 93 when the level of the body 20 of liquid reaches the set point, this elevates or depresses the setting of the free end of the arm 85. The lifting of this arm 85 by the bellows 75, through the bell crank 76, link 78 and arm 80 is, accordingly, retarded or accelerated and hence the valve 26 is throttled in response to a lower or higher level of the body 20 of liquid under control. The indicator hand 82 on the arm 80 is adjusted, as hereinafter described, to register with the set hand 90, on the gear 86, when the valve 26 is closed at the set point of the hand 90.

If an excess pressure develops in the control line 65, the bellows 75, through the bell crank 76, link 78, arm 80 and arm 85 lifts the circular baffle 92 entirely free from the nozzle 93. This, through the tubular arm 94 and line 96, further deflates the capsular chamber 101 which, through the pin 102, lowers the ball against the lower seat of the enlargement 105 of the vent tube 103. This admits full line pressure from the air supply branch 55, through the upper part of vent tube 103 and branch 106 to the line 32, thereby insuring that the control valve 26 is closed under such conditions.

The controller 50 is adjustable as to sensitivity. By sensitivity is meant the measure of proportional response, that is, the ratio of output pressure on the control valve 26 to the movement of the hand 82 responsive to changes in the back pressure in the control line 65. High sensitivity results in a large output pressure change for a given deviation of the hand or pointer 82.

Assuming that the lag and capacity of the controller 50 are such that a sensitivity of 8 points per inch must be used to stop hunting and that 10 pounds pressure on the diaphragm valve 26 passes sufficient liquid to the body 20 between the drums to carry the load on the dryer at equilibrium, the control point would coincide with the set point at 10 pounds output pressure in the line 32 and on the control valve 26. Assume also that the controller 50 is at equilibrium and that it is desired to decrease the set point one-half inch on the scale 83.

As previously described, turning the knob 89 and pinion 88 clockwise, as viewed in Fig. 2, rotates the gear 86 and moves the tip of the set pointer 90 to the right. This movement of the set pointer 90 would be the one-half inch assumed. The rotation of the gear 86 lifts the fulcrum point of the arm 85 thereby raising the circular baffle 92 away from the nozzle 93. The resultant decreased pressure in the capsular chamber 101 lowers the ball 105 away from the upper seat of the enlargement 104 thereby allowing more air from the supply branch 55 to enter through the tube 103 and branch 106 to the line 32, thereby to increase the output pressure of the controller. This increased output pressure not only closes the control valve 26 to retard the flow of liquid to the dryer but also increases the pressure on the bellows 111 pushing the pin 120 to the left, as viewed in Fig. 2. The parallelogram 121 transmits this motion, through the abutment 125, to the tubular arm 94 which carries the nozzle 93 and which pivots at 95. This movement of the parallelogram 121 moves the nozzle 93 upwardly to follow the circular baffle 92 until the discharge of air from this nozzle 93 is throttled by the baffle. Since the set point is now one-half inch below the pointer 92 and the controller is set in a sensitivity of 8 pounds per inch, an output change of 4 pounds has taken place. The output pressure will be 10 plus 4 or 14 pounds per inch.

Decreased liquid flow to the dryer, due to the increased pressure on the diaphragm control valve 26, allows the level of the liquid held between the drums of the dryer to fall. This change of level is reflected in a decreased back pressure in the purge or bleed pipe 66 and control line 32 and is transmitted to the arm 80 by the bellows 75, bell crank 76, and link 78. This causes the arm 80 to rotate counterclockwise, as viewed in Fig. 2, about its pivot 81, thereby to lower the arm 85 and its circular baffle 92. The increased nozzle pressure caused by this downward movement of the circular baffle 92 decreases the output air pressure in line 32, as previously described, and through the bellows 110 and parallelogram 121 this decreased pressure in line 32 causes the nozzle 93 to recede as the circular baffle descends. When the level of liquid in the body 20 reaches the set point the controller output pressure is 10 pounds per inch and the bellows 110, parallelogram 121 and nozzle 93 are in their original position. The upward movement of the pivot point for the arm 85 caused by changing the set point has been balanced by the downward movement of the free end of the arm 80 so that, in effect, the circular baffle 92 has simply been rotated slightly about its center.

With the controller 50 as shown, a change in load may occur which requires a different flow of liquid to the dryer to maintain the control point and the indicator 82 will not coincide with the set pointer 90. The synchronizing wheel or screw 115 must then be adjusted. A counterclockwise rotation of this wheel 115 increases the tension of the spring 113, this lowering the nozzle 93 and increasing the controller output pressure in line 32. A clockwise rotation of the wheel 115 decreases the output pressure in line 32. This synchronizing wheel 115 thereby permits of adjusting the controller to the proper output pressure and restoring the control point to the set point.

It will be apparent that the controlling medium flowing through the branch line 56 can be any gas. If such a gas has moisture absorbing qualities it must be humidified to a point where there is no tendency of the surging liquid within the lower end of the purge pipe 66 to dry and deposit successive coatings on the inner sides of the purge pipe, and thus gradually reduce its area thereby to cause increased back pressure on the control line 65 and a drop in the liquid level between the drums. It will also be seen that instead of using a moisture absorbing gas as the controlling medium, it is possible to use steam alone. With steam alone as the controlling medium, the branch line 56 would be eliminated and the steam pressure, as indicated on a gage 168, would be regulated by an adjustable pressure reducing valve 169, both of these being in the steam line 156. The back pressure against the steam supplied through line 156 under a constant pressure would, of course, be reflected through the control line 65 to the controller 50, this in turn regulating the diaphragm valve 26 to maintain the desired level of the liquid between the drums, as previously described.

Another effective way to reduce destructive surging in the control line 65 is to reduce the size of the outlet opening in the lower end of the bleed pipe 66. In practice, however, a hole of such small diameter may easily become clogged by scale, lint, dirt, etc., and hence it is more desirable to increase the size of the open end of the bleed pipe and to prevent destructive surges by the use of the orifice forming devices 69, 70 and capacity tank 63. It follows, however, that for various purposes, various forms and sizes of the bleed pipe 66 can be provided. The lower end of the bleed pipe 66 can be reduced, as above indicated, or enlarged in size to form an inverted funnel or bell for the purpose of preventing the surging liquid from entering the contracted part of the bleed pipe. This bell form of the lower end of the bleed pipe may be advantageous where the temperature of the liquid will cause the vapors to flash within the bell and hence maintain a high humidity of the air within the bleed pipe. The bell of the bleed pipe could also be water jacketed for the purpose of condensing some vapor on its inner surface and thus prevent any accumulation or coating of the bell with the liquid being dried within the bell.

It will also be apparent that the size and length of the control line 65 will affect the operation of the control. To obtain quick response to pressure variations in the balancing or bleed pipe 66, the size of the control line 65 and hence the volume of air therein should be kept to a practical minimum, considering, of course, the length of pipe, rate of flow, friction, etc. From a practical viewpoint, a standard pipe size of one-quarter inch appears more desirable, although smaller or larger size pipe diameters can be used successfully.

From the foregoing it will be seen that the present invention provides a very accurate control for the level of a liquid which is boiling and concentrating and which will function without danger of clogging and without the necessity for constant supervision to maintain the level of the liquid accurately. This in turn greatly facilitates the drying operation especially with a double drum dryer, and insures uniformity in the product and drying conditions, and increased life of the dryer.

We claim as our invention:

1. A liquid level control for a body of liquid subject to diminution, comprising means for supplying a stream of feed liquid to said body, a valve controlling the flow of feed liquid through said supplying means, means forming a chamber immersed in said body and having an opening in its underside, means for supplying a gas capable of absorbing moisture to said chamber under sufficient pressure to continuously pass through said opening and to bubble up through said body, means for humidifying the gas so supplied to said chamber, and means responsive to the changes in pressure in said gas and controlling said valve to control the flow of feed liquid therethrough.

2. A liquid level control for a body of liquid subject to diminution, comprising means for supplying a stream of feed liquid to said body, a valve controlling the flow of feed liquid through said supplying means, means forming a chamber immersed in said body and having an opening in its underside, means for supplying gas capable of absorbing moisture under pressure to said chamber under sufficient pressure to continuously pass through said opening and to bubble up through said body, means for adding steam to the gas so supplied to said chamber, and means responsive to the changes in pressure in said gas and controlling said valve to control the flow of feed liquid therethrough.

3. A liquid level control for a body of liquid subject to diminution, comprising means for supplying a stream of feed liquid to said body, a valve controlling the flow of feed liquid through said supplying means, means forming a chamber immersed in said body and having an opening in its underside, a control line connecting at one end with said chamber, means for supplying compressed gas capable of absorbing moisture through said control line to said chamber under sufficient pressure to bubble up through said body, means connected with said control line and with said valve and responsive to changes in gas pressure in said control line and controlling said valve to control the flow of feed liquid therethrough, and means for humidifying the gas supplied to said chamber, comprising a branch line connected with said control line, means for supplying steam under pressure to the other end of said branch line, and means providing a restricted orifice in an intermediate part of said branch line and metering the amount of steam admitted to said chamber.

4. A liquid level control for a body of liquid subject to diminution, comprising means for supplying a stream of feed liquid to said body, a valve controlling the flow of feed liquid through said supplying means, means forming a chamber immersed in said body and having an opening in its underside, means for supplying gas capable of absorbing moisture to said chamber under sufficient pressure to continuously pass through said opening and to bubble up through said body, means for adding water to the gas so supplied to said chamber, and means responsive to the changes in pressure in said gas and controlling the flow of feed liquid therethrough.

5. A liquid level control for a body of liquid subject to diminution, comprising means for supplying a stream of feed liquid to said body, a valve controlling the flow of feed liquid through said supplying means, means forming a chamber immersed in said body and having an opening in its underside, a control line connecting at one end with said chamber, means for supplying compressed gas capable of absorbing moisture through said control line to said chamber under sufficient pressure to bubble up through said body, means connected with said control line and with said valve and responsive to changes in gas pressure in said control line and controlling said valve to control the flow of feed liquid therethrough, and means for humidifying the gas supplied to said chamber, comprising a branch line connected with said control line, a sight glass in said branch line, and valved means for dripping water through said sight glass into said branch line.

6. A liquid level control for the body of boiling liquid being concentrated in the liquid space between the heated drums of a double drum dryer, comprising means for supplying a stream of feed liquid to said body, a valve controlling the flow of feed liquid through said supplying means, an L-shaped tube having its vertical leg open at its lower end and immersed in said body of liquid and having its other leg horizontally disposed, means for supporting said horizontal leg on the frame of said dryer, means for supplying gas capable of absorbing moisture to said horizontal leg of said tube under sufficient pressure to continuously pass through the open vertical leg thereof and to bubble up through said body, means responsive to changes of the pressure of said gas and controlling said valve to control the flow of feed liquid therethrough, and means humidifying the gas so supplied to said horizontal leg of said tube.

7. The method of controlling the level of a body of boiling liquid being concentrated, comprising supplying a stream of feed liquid to said body, confining a body of gas capable of absorbing moisture below the surface of said body of liquid and in contact therewith, supplying gas under pressure to said body of gas under sufficient pressure to escape from said body of gas and to bubble up through said body of liquid, humidifying the gas so supplied to said body of gas and regulating the rate of flow of said stream of feed liquid in response to changes in pressure of the gas so supplied to said body of gas.

CHARLES O. LAVETT.
HENRY F. KERKER.